Dec. 27, 1955

R. G. FOWLER ET AL 2,728,526

POWER DRIVE MECHANISM

Filed Oct. 4, 1952

INVENTORS
ROLAND G. FOWLER
NELSON R. FRIEBERG
& OSCAR F. LARSEN

BY

THEIR ATTORNEYS

Dec. 27, 1955  R. G. FOWLER ET AL  2,728,526
POWER DRIVE MECHANISM

Filed Oct. 4, 1952  9 Sheets-Sheet 3

INVENTORS
ROLAND G. FOWLER
NELSON R. FRIEBERG
& OSCAR F. LARSEN
BY Earl Beust
Justin S. Lomston
THEIR ATTORNEYS Dec. 27, 1955  R. G. FOWLER ET AL  2,728,526
POWER DRIVE MECHANISM Filed Oct. 4, 1952  9 Sheets-Sheet 9

INVENTORS
ROLAND G. FOWLER
NELSON R. FRIEBERG
& OSCAR F. LARSEN

THEIR ATTORNEYS

United States Patent Office 2,728,526
Patented Dec. 27, 1955

2,728,526
POWER DRIVE MECHANISM

Roland G. Fowler, Newfield, and Nelson R. Frieberg and Oscar F. Larsen, Ithaca, N. Y., assignors to The National Cash Register Company, Dayton, Ohio, a corporation of Maryland Application October 4, 1952, Serial No. 313,154

15 Claims. (Cl. 235—62)

This invention relates to calculating machines, and more particularly pertains to improved mechanism for driving the main operating means and to improved machine release mechanism of such machines.

The invention will be disclosed as embodied in a machine basically of the type described in the application for United States Letters Patent No. 237,758 of Roland G. Fowler, Nelson R. Frieberg and Oscar F. Larsen, filed July 20, 1951, but the general principles of the invention are applicable to other machines.

The machine disclosed in said patent application is an electric power-operated machine, the motor being mechanically coupled to the main operating means, and uncoupled therefrom, by a clutch. This invention provides, by way of improvement, the introduction into the aforesaid machine of a fluid drive for the main operating means, the fluid drive being energized by the electric motor. The electric motor used in this invention, moreover, is of the continuously running time cut-off type, whereas the motor disclosed in said patent application is one that starts and stops each machine operation.

In the basic machine described in said application, the main operating means is driven by the motor through the mechanical clutch which is caused to engage by action of a solenoid energized by operation of any one of a plurality of digit keys. In this invention the solenoid renders the hydraulic drive effective. When the electric motor is running, the hydraulic drive is energized and the operation of a digit key operates the solenoid which in turn operates a valve to direct the hydraulic drive into a hydraulic motor to drive the main actuating means. By dispensing with the mechanical clutch the shocks incident to starting and stopping of the machine are taken up largely by the hydraulic system, which includes a pressure relief means.

Means is provided to keep the electric motor and hydraulic drive coupled thereto operating continuously for a predetermined period of time, pending the commencement of another machine operation, after which said time period it starts running again.

The hydraulic drive is of the rotary vane pump type and the hydraulic motor, also of the rotary vane type, is driven thereby, the hydraulic motor being coupled directly to the main operating means of the machine.

In addition to the initiation of a machine operation by the digit keys and solenoid, the same may be done mechanically by some of the control keys. In general the basic machine in which the invention is shown includes a totalizer, differentially settable means, a plurality of denominational rows of digit keys for controlling the differentially settable means, a main operating means, totaltaking means and key release means, all of the foregoing being known mechanisms, but which cooperate with the novel mechanism of this invention, and consequently they are shown in the drawings and will be described briefly with that end in view.

It is an object of the invention to provide a calculating machine with a novel electric motor powered hydraulic drive for the main operating means.

It is another object of the invention to provide such a drive, initiation of the operation of which is under control of any of the digit keys.

It is a further object of the invention to provide such a hydraulic drive in which the electric motor, when once started, continues to run for a period of time after a machine operation, which period is renewed at every intervening machine operation.

With these and incidental objects in view, the invention includes certain novel features of construction and combinations of parts, a preferred form or embodiment of which is hereinafter described with reference to the drawings which accompany and form a part of this specification.

Of the drawings:

Fig. 6 is a diagrammatic representation of the hydraulic drive system from a point where the system is energized by the motor to the point where the hydraulic drive actuates the main drive mechanism;

Fig. 15, on the sheet bearing Fig. 3, shows the solenoid switch in perspective;

Fig. 16, on the sheet bearing Fig. 6, is a scetion through the hydraulic pump;

Fig. 17, on the sheet bearing Fig. 6, is a section through the hydraulic motor; and Fig. 18, on the same sheet bearing Fig. 4, is a section through the motor and pump, showing the drive gearing.

Brief description of the basic machine

Figure 1:
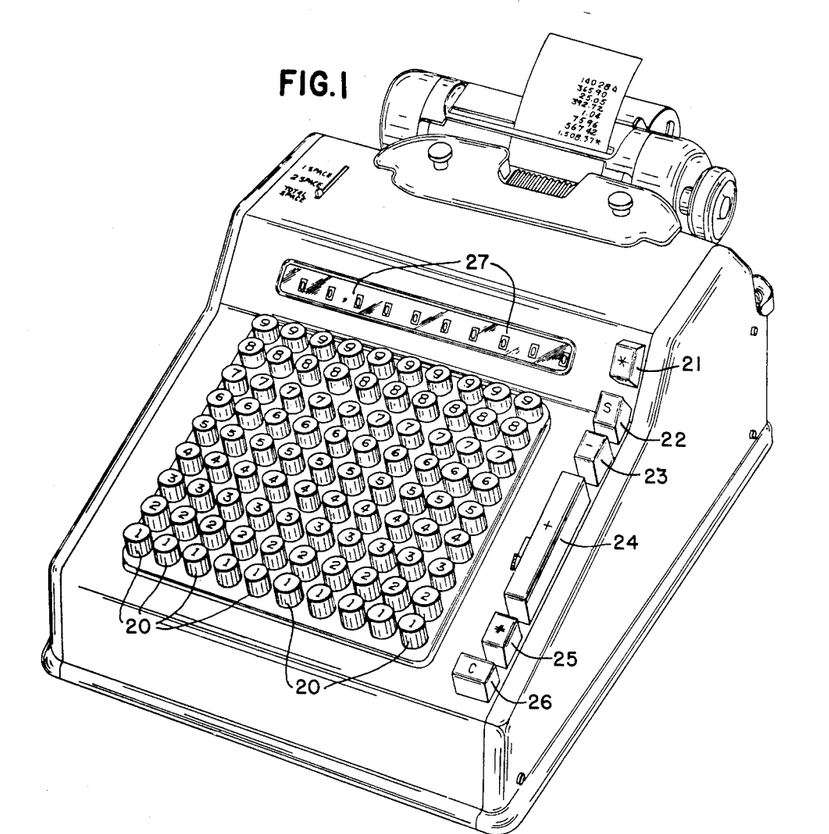
Fig. 1 is a perspective view of the machine.

Referring to Fig. 1, the machine includes a plurality of denominational rows of digit keys 20, a total control key 21, a sub-total control key 22, a subtract control key 23, an add motor bar 24, a non-add key 25, and a correction key 26. As will be explained later, each of the digit keys has two stages of operation, a first stage in which the key is depressed against its own individual spring to a latching position in which it is latched against outward movement and in which positon it controls the differentially settable means to be described, and a second stage of movement against a further common spring, said second stage of movement actuating the solenoid switch which initiates a machine operation. The total key 21 when depressed, in addition to preparing the machine for a total operation, mechanically initiates a machine operation of two cycles. The sub-total key prepares the machine for a sub-total operation and mechanically initiates a machine operation of two cycles. The subtract key 23 initiates a single cycle machine operation in which the amount set up on the keyboard is entered into the totalizer subtractively. The add motor bar 24 initiates a single cycle machine operation in which the amount set up on the keyboard is entered into the totalizer additively. The non-add key 25 mechanically initiates a machine operation in which the amount set up on the keyboard is printed but not entered into the totalizer. The correction key 26 releases the latching mechanism for the keys, allowing any key depressed to the latching position, and latched there, to be released.

Figure 2:
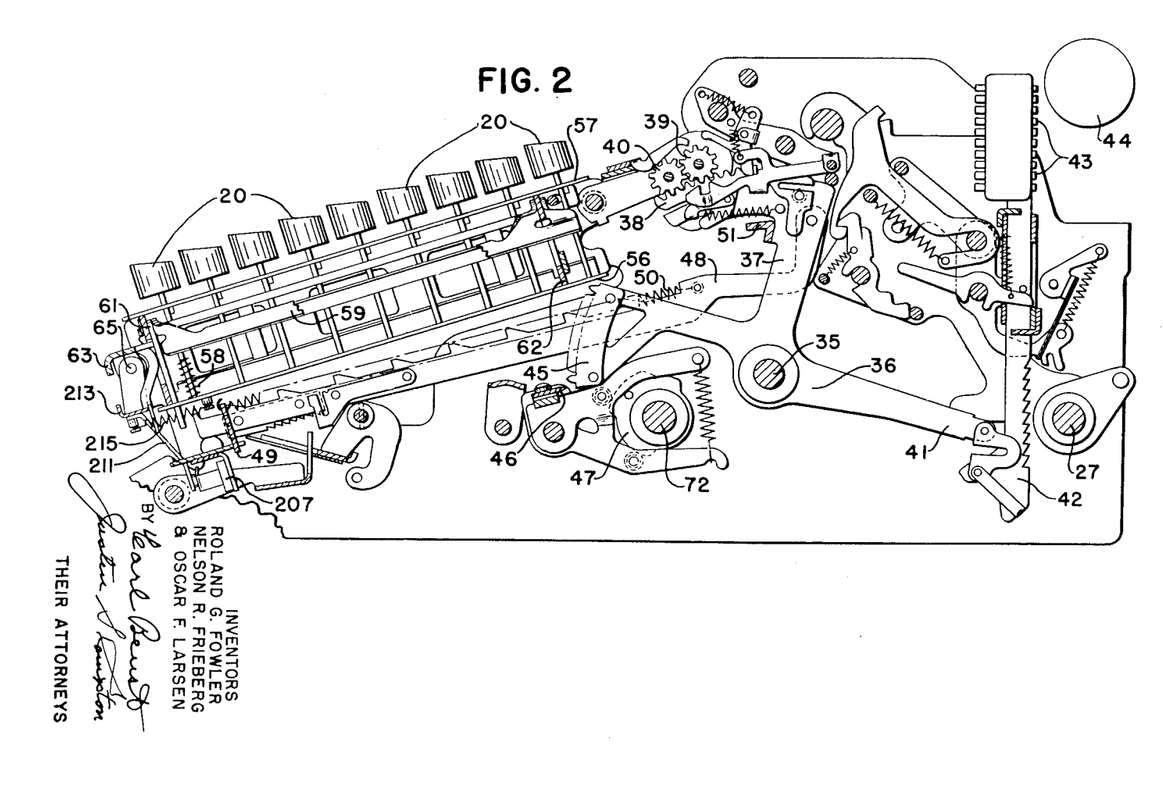
Fig. 2 is a section through the machine from front to rear, showing the main features of the differentially settable mechanism and the key control thereof, together with the totalizer mechanism.
Figure 3:
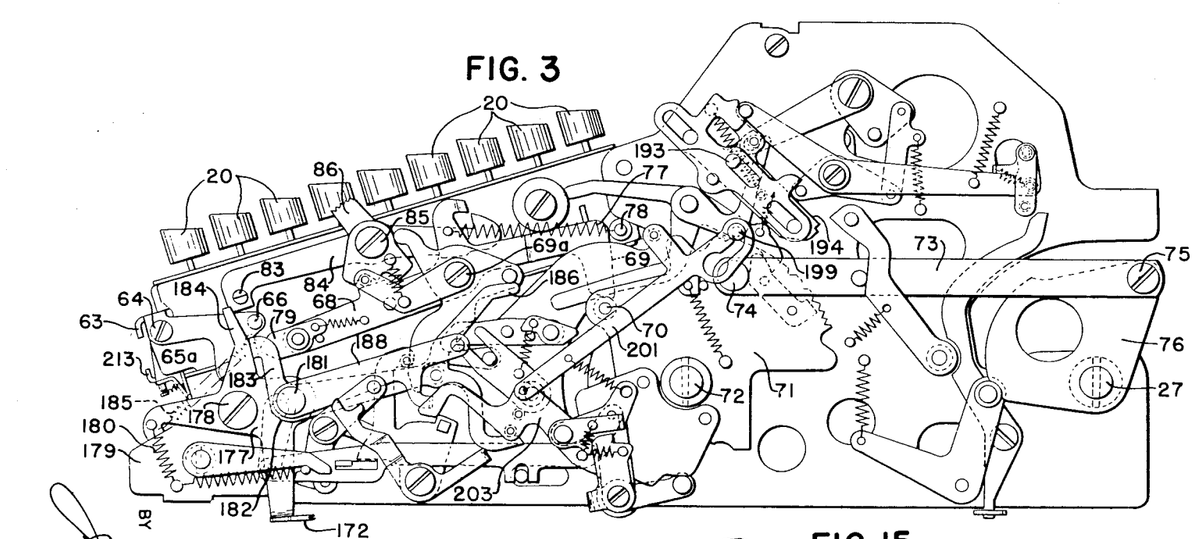
Fig. 3 is a view of the right side of the machine with the cabinet off, showing such of the main drive mechanism as pertains to that side of the machine, the key release mechanism, and such of the machine starting means as pertains to the operation control keys.
Figure 4:
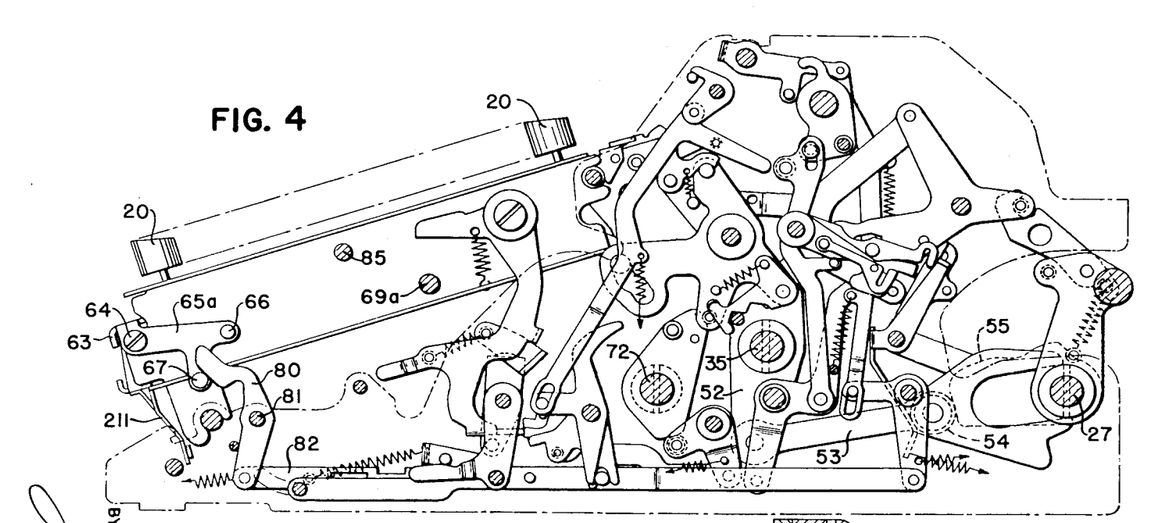
Fig. 4 is a view of some of the other mechanism of the right side of the machine, showing the key release means for total-taking operations and some of the total-taking mechanism pertaining to the main drive mechanism.
Figure 5:
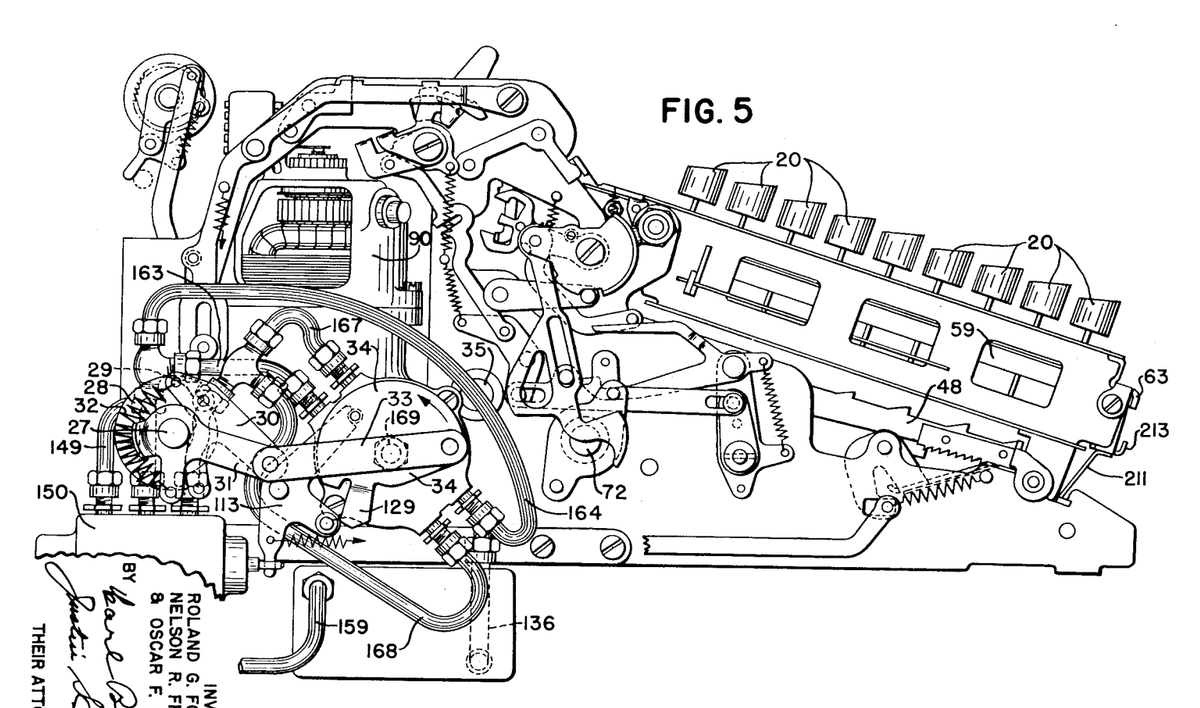
Fig. 5 is a view of the mechanism on the left side of the machine showing the electric motor, the hydraulic drive, the connections between the hydraulic drive and the main operating means, and the hydraulic valve.

The main drive shaft 27 of the machine is shown in Figs. 2, 3, 4, 5, 11, 12 and 14. Referring to Fig. 2, in one machine cycle the shaft 27 first oscillates counterclockwise and then clockwise, or as seen in Fig. 5, the shaft 27 oscillates first clockwise and then counterclockwise.

Secured to the left end of main drive shaft 27 (Fig. 5) is a plate 28 having a peripheral notch engaged by a roller 29 on the end of a link 30, pivoted to the outer end of a crank 31, loosely mounted on shaft 27. The roller 29 is held in the notch of plate 28 by a spring 32 extending between the outer end of link 30 and a downwardly projecting arm of crank 31. This forms a resilient connection between crank 31 and shaft 27 that under ordinary circumstances will drive the machine, but which, if an obstruction occurs in the operation of the machine, will disconnect so that the machine will not be damaged. The outer end of crank 31 is pivoted to a drive link 33, the other end of which is pivoted to drive plate 34, which is driven by the hydraulic motor to be described. In one cycle of machine operation the drive plate 34 rotates 360 degrees, driving the drive shaft first clockwise and then counter-clockwise, as viewed in Fig. 5. As has been said, the main operating means oscillates or rocks once for item entering operations and rocks twice for total-taking or sub-total-taking operations.

The differentially settable means

In order to enter data into the totalizer and take data from the totalizer there are mounted on differential shaft 35 a three-armed lever 36 (Fig. 2) for each denominational order, an upwardly-extending arm 37 of each being equipped with a rack 38 for engagement with the totalizer wheels 39 and 40. The racks engage wheels 39 on adding operations and wheels 40 on subtract operations. The rearwardly extending arm 41 of each of the three-armed levers is coupled to its own printer bar 42, which is moved so that type 43 thereon is adjusted opposite the printer platen 44, according to the value of the data entered into or withdrawn from the totalizer.

On a forwardly extending arm of each of the three-armed levers is secured an alining rack 45 engaged by an alining bar 46 during a machine operation, after the data has been set up either by the keys or by the totalizer, under the actuation of cams 47. The differential mechanism is more fully described in the patent application to which reference was made, and attention is directed to it for the particularities of this mechanism, as they are not particularly pertinent to this invention.

These three-armed levers are spaced across the machine so as to be in alinement with their respective rows of keys, except that the rearwardly extending arms 41 are bent toward the middle so as to be compactly in alinement with the printer mechanism which is less in width than the keyboard.

Pivoted to the upwardly extending arm of each of the three-armed levers is a stop bar 48, the front edge of which rests in a comb 49 extending across the machine under the front end of the keyboard. Extending between the comb 49 and the rearward end of each stop bar is spring 50 tending to pull the stop bar forward and to swing the associated three-armed lever counterclockwise. This forward movement of the stop bars and the counterclockwise rocking movement of the three-armed levers are normally restrained by a bail 51 extending across and in front of the upwardly extending arms of all the stop bars. This leading bail is supported on arms which are mounted on shaft 35. The right arm 52 of the two arms is shown in Figure 4 and it has pivotally connected at its lower end a link 53, a rear bifurcated end of which embraces the main drive shaft 27. Immediately in front of the bifurcation is mounted a roller 54, which is engaged by a cam 55 pinned to the main drive shaft 27. As a machine operation commences, the shaft 27 rocks counterclockwise so that link 53 may move rearwardly under the urge of the springs of any stop bars that have been released, the ball being free to move by reason of cam 55 moving so its minor radius is in line with roller 54. On the return movement of the drive shaft, the cam 55 pushes against roller 54, returning the leading frame to normal position, carrying the three-armed levers and associated stop bars therewith.

Control of the differentially settable means

In entering data into the totalizer, the differentially settable means, comprising the three-armed levers 36 and the stop bars 48, are controlled by the digit keys 20, which are arranged in denominational rows, this particular embodiment being in the decimal system, with nine keys in each denominational row, as shown in Fig. 1.

Figure 10:
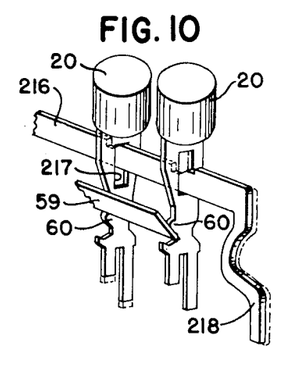
Fig. 10 is a view showing the key construction as it relates to moving the associated slide which closes the solenoid switch when a key is actuated.

Referring to Fig. 2, which shows a typical denominational row of nine keys, each is slidably mounted in frame plates 56 and 57, which form the top and bottom plates of the keyboard unit assembly. Each is furnished with a return spring 58, which normally holds the key outwardly in undepressed position and against which the key may be resiliently depressed. When a key is depressed it is latched in depressed position by a latch plate 59, there being one common to all the keys of a row. This latch plate 59 for a given row runs along the left-hand side of the keys of a row, as shown in Fig. 10, projections 60 on the keys being latching lugs or formations designed so that as a key is depressed the latch plate is forced outwardly, but snaps in above the lug of the depressed key. These latch plates are pivoted in the front plate 61 (Fig. 2) and the rear plate 62 of the keyboard unit. As seen in Fig. 2, the latch plate 59 cooperates with the next lower order keys than those represented in Fig. 2, the latch plate for the row of keys shown in Fig. 2 being hidden by other mechanism. As a key is depressed and latched in depressed position the lower end of its key stem extends below the bottom plate 56 into the path of teeth on stop bar 48, the teeth on stop bar 48 being so spaced that as it comes to rest against a depressed key stem end the differential mechanism is allowed to move by rocking around shaft 35 an angular distance corresponding to the value of the key depressed. For instance, if the key representing "1" was depressed and the machine operated, the stop bar and associated differential mechanism would be allowed one step of movement, and if in the following operation the "6" key was depressed, the stop bar and associated differential mechanism would move six steps in the ensuing machine operation. The keyboard is of the flexible type, that is to say, if a key has been depressed in a row and then another key in that same row is depressed, the former depressed key will be released, and this is brought about by the fact that the latch plate 59 is common to all the keys in the denominational order and if a second key is depressed, the latch plate is swung out, against spring tension, so as to release the formerly depressed key. All this construction is old and will be found in the said United States patent application, Serial No. 237,758, before mentioned.

In a total-taking operation or sub-total-taking operation the differentially settable means is moved under control of the totalizer wheels. When there is a positive amount in the totalizer the control will be under wheels 39 and when there is a negative amount in the totalizer the control will be under wheels 40, the totalizer being shiftable laterally to engage either the wheels 39 or the wheels 40, according to the mechanism set out in said United States patent application, Serial No. 237,758. As this shifting totalizer mechanism does not bear particularly upon the novel mechanism of the present invention, a detailed description of it will not be given.

*Key release mechanism*

In order to release depressed and latched keys there is provided a key release mechanism comprising a bail 63 (Figs. 2 and 4) pivoted in the side plates of the keyboard unit and said bail having a comb that cooperates with the key latch plates of all the denominations, so that if said bail is rocked clockwise around the pivot 64 (Fig. 4) and the pivot 65 (Fig. 2) the key latch plates 59 for all of the rows of keys will be moved to ineffective position, releasing the latched keys and allowing them to return to their normal position under the influence of their springs 58.

Referring to Figs. 3 and 4, the key release bail has a rearwardly extending arm 65a having studs 66 and 67, downward movement of which arm rocks the bail in key release movement. During each machine cycle lever 68, pivoted at 68a to the right frame plate, is rocked first clockwise and returned counter-clockwise near the end of the machine cycle. The rearward end 69 of lever 68 rests on stud 70 on a plate 71, pinned to shaft 72. Plate 71 is actuated by link 73 pivoted at 74 to plate 71, and pivoted at 75 to a plate 76, pinned to main drive shaft 27. As the main drive shaft 27 (Fig. 3) rocks counter-clockwise, so will plate 71, removing stud 70 from the rear end 69 of lever 68, which will then rock clockwise in response to the urge of spring 77 extending between an upwardly-extending arm of the lever 68 and a stud 78. As lever 68 rocks clockwise, a spring actuated by-pass pawl 79, pivoted on the forward end thereof, by-passes stud 66, and on the return half of the cycle, as plates 76 and 71 are rocked clockwise, the stud 70 will meet the rear end 69 of lever 68, bringing by-pass pawl 79 against stud 66, rocking the release bail in key releasing motion, thus restoring the keys to normal position.

Referring to Fig. 4, lever 80 mounted on pivot 81 is actuated during the first cycle of a two-cycle total-taking or sub-total-taking operation through the backward movement of link 82, causing the upper extending arm thereof to bear downward on stud 67, rocking the release bail 63 in key release motion. The manner in which lever 80 is rocked is part of the total-taking mechanism which is not particularly pertinent to this invention, and is more fully described in the aforesaid application.

The correction key 26 (Fig. 1) has a lower extending arm which bears against stud 83 (Fig. 3) on a lever 84 pivoted on stud 85. As the correction key is depressed inwardly the forwardly and downwardly extending end of lever 84 pushes against stud 66, rocking the bail in key release movement.

The repeat lever 86 pivoted on the stud 85, when rocked clockwise, blocks lever 68 from making its clockwise excursion and, hence, the keys will not be released at the end of an item entering cycle of operation, leaving the keys depressed for controlling the differentially settable mechanism in the next operation.

*The electric motor*

The main operating means is powered by an electric motor 90 (Figs. 5 and 14) the motor being connectable to a source of electric energy 91 through a main switch 92, which normally tends to open, and may be connected to the source of energy through an auxiliary switch 93 (Fig. 14), which normally tends to close.

Figures 12, 13:
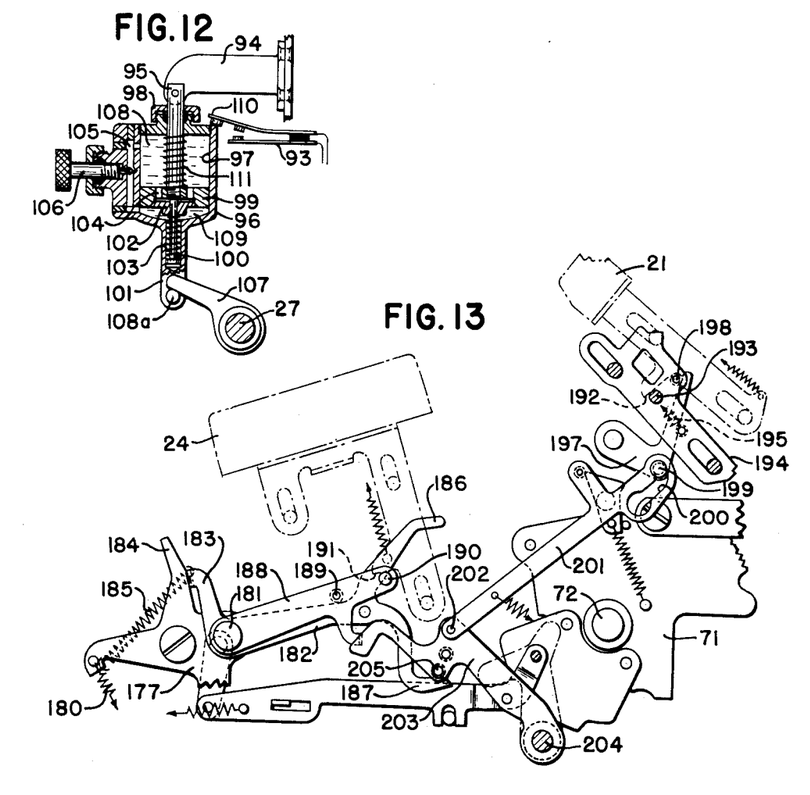
Fig. 12 is a view of the dashpot retarder mechanism and the switch for the auxiliary circuit of the motor, partly in section.
Fig. 13 is a detail view of the means by which the machine is tripped by the add motor bar and by the total control key.

As seen in Fig. 12, there is fastened to the main frame by a bracket 94 the piston rod 95 of a dashpot 96, said piston rod extending through a packing 98 to the interior chamber 97 of the dashpot, where it is attached to the piston 99. The piston 99 has an extension pin 100, which fits into the bore of extension 101 of the dashpot 96, and on which a valve 102 floats, which valve is pushed against the piston 99 by a spring 103. The piston has fluid ports, such as port 104, connecting the chamber on one side with the chamber on the other, said valve normally closing those ports so that the fluid cannot get from one side of the piston to the other except through by-passage 105, the capacity of flow of which is governed by needle valve 106. Main drive shaft 27, viewed from the right side in Fig. 12, moves first counter-clockwise on the first half of a machine cycle and an arm 107 secured thereto makes contact with the stud 108a attached to the extension 101 and pulls down on the cylinder, creating pressure in the upper part of the cylinder chamber, forcing fluid 108 against the valve 102 with such force that valve 102 opens against the return action of spring 103 and permits the fluid to pass rapidly to the lower part 109 of the chamber 97. On the second half of the machine cycle, arm 107 rocks clockwise but the stud 108 cannot follow as the major portion of the fluid is now below the piston and the valve 102 is shut tight, so that the only way for fluid to get into the upper part of the chamber 97 is through the by-passage 105, as controlled by needle valve 106. This can be regulated so that only a very fine stream of fluid passes on the return movement of the dashpot, and may be adjusted to take as many as three or four minutes. The auxiliary switch 93 has an extended upper blade 110 which rests on the chamber of the dashpot, which when in the position shown in Fig. 12, that is to say: the unoperated condition of the dashpot, holds switch 93 open. As the dashpot cylinder is forced downward by arm 107, the switch 93 closes and stays closed until the dashpot resumes its normal position under the influence of spring 111 extending between the piston 99 and the top wall of the cylinder. This means that when the machine is once started by the closing of the main switch 92 (Fig. 14) the auxiliary switch will be closed on the first half of a machine cycle, and even though the main drive shaft 27 (Fig. 12) is returned to home position, the dashpot will not return to normal position for a matter of minutes, keeping the motor running after the end of a cycle of machine operation. If during the return of the dashpot to normal position the machine is operated again, the dashpot will be operated fully, so that the period of its return will be started all over again. It will be seen, therefore, that the machine is provided with a motor which, if started, will run continuously for a period of time beyond the cycle of machine operation which started it, after which it stops unless there is an intervening machine operation.

Machine release mechanism

Figure 14:
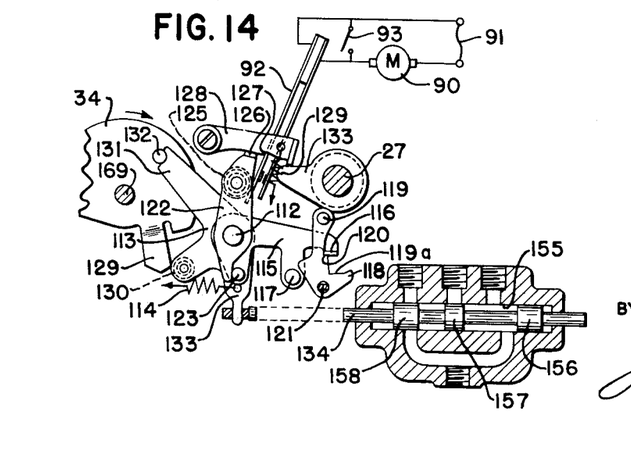
Fig. 14 is a view of the trip mechanism, the main switch for the electric motor, the trip latch and their relation to the hydraulic valve, the electric motor and circuit being shown diagrammatically.
Figure 15:
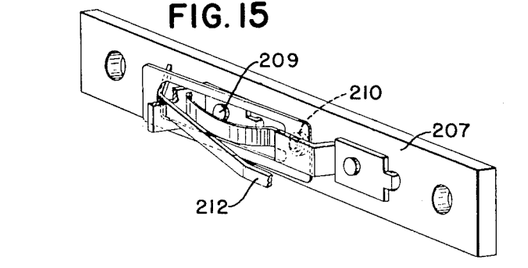
Figure 18:
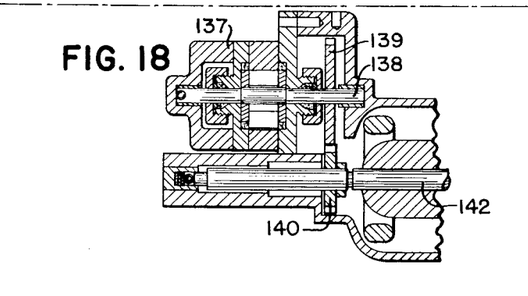

On a cross-shaft 112 is secured a three-armed lever 113 (Fig. 14) which is urged clockwise by spring 114, as seen in Fig. 14. Also secured to shaft 112 is a trip lever 115 with a bent-over ear 116 and a stud 117 between which a trip latch 118 plays, said trip latch being pivoted on a pivot 119 secured to a motor frame-supported bracket. The latch has a lower step 119a and an upper step 120, the bent-over ear resting on the upper step of the latch when the machine is in home position. If the lower end of the latch is moved forwardly by the trip lever 121, the ear 116 will be unsupported and the three-armed lever 113 will rock clockwise in response to the urge of spring 114 until the ear 116 comes to rest on the lower step 119a of the latch 118. Loosely mounted on shaft 112 and next to trip lever 115, is a switch closing lever 122 having a depending tail resting against a stud 123 on a lower extending arm of trip lever 115, and having on its upper end a roller 125 which bears against the spring blade of main switch 92 so that when the trip lever moves clockwise to a point where ear 116 rests on step 119a the switch will be closed. In that position of the trip lever an ear 126 on the upper end of switch closing lever 122 is engaged by a notch 127 on a latch lever 128 urged downwardly by spring 129. As the motor commences operating, the hydraulic drive, to be described, is energized, which rotates the drive plate 34 in the direction of the arrow, as seen in Fig. 14. As the drive plate 34 rotates, a cam projection 129 thereon, when about to reach home position, strikes roller 130 on trip lever 115, knocking it counter-clockwise, as seen in Fig. 14, bringing arm 131 into the path of stud 132 on drive plate 34, stopping the plate in home position, causing the ear 116 to latch onto the upper step 120 of the latch 118. This leaves the switch closing lever 122 latched by latch 128 in operated condition for a few degrees of movement of the main operating mechanism until an arm 133 on the main drive shaft 27 knocks the latch lever 128 upwardly so that switch closing lever 122 is forced around by the spring in the switch blade to where the tail of lever 122 strikes the stud 123. The lower arm 133 of trip lever 113 has a narrow portion which engages the valve rod 134 by a pin and slot coupling, the valve rod controlling the fluid drive next to be described.

The fluid drive

Figures 6, 16, 17:
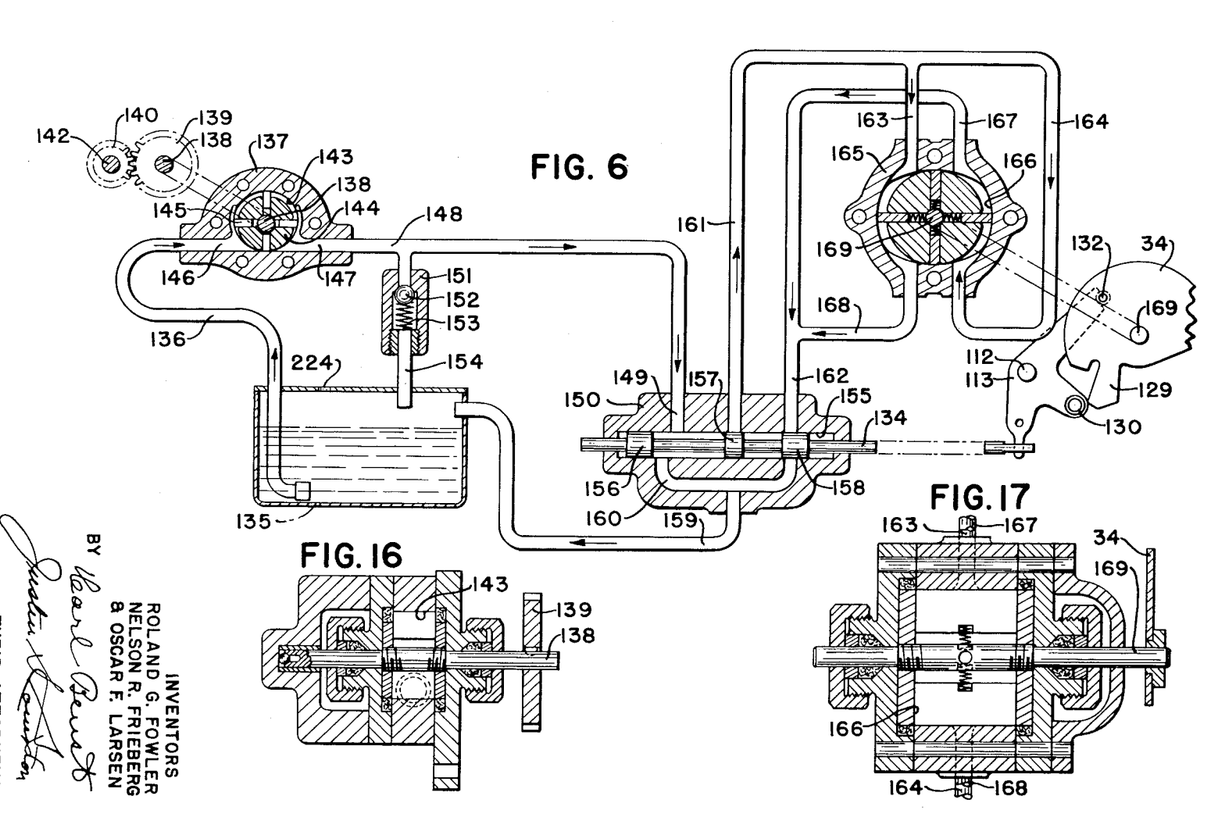

The fluid drive, which is shown in diagrammatic form in Fig. 6, includes a reservoir tank 135 of fluid, preferably oil, into the bottom of which extends an intake pipe 136 which conveys fluid to the intake port 146 of a rotary vane type of hydraulic pump 137, the drive shaft 138 of which has secured thereon a gear 139, which is in mesh with a small gear 140 secured on the armature shaft 142 of the electric motor 90 (see Fig. 5). As is usual in such pumps, the interior thereof includes a cylindrical chamber 143, in which a rotor 144 rotates. The rotor is slotted longitudinally to receive vanes, such as vane 145, spring-pressed outwardly toward the cylindrical walls of the chamber, the particular rotor shown having four such vanes. The fluid is swept by the vanes from the intake port 146 to the delivery port 147 and from there through pipe 148 to the intake port 149 of the hydraulic valve 150. If for any reason the hydraulic system is subjected to excess pressure the pressure is relieved by ball valve 151. After excess pressure has been reached in the system, the ball 152 is forced to move from its seat, against the spring 153, by-passing the pump driven fluid into the reservoir through pipe 154.

The hydraulic valve piston 134 works within the cylindrical distributing chamber 155 of the valve and has spools 156, 157 and 158, which are the diameter of the chamber, the other connecting portions of the valve rod 134 being of reduced diameter. The spools are so arranged with respect to the different ports of the valve as to act as valve closing and opening means when the rod 134 is moved to and from its normal position, shown in Fig. 6. When the machine is tripped for operation the piston 134 is moved to the right as lever 113 rocks counter-clockwise. In the position of the valve rod as shown, the fluid entering through intake port 149 passes out through exhaust pipe 159 by way of branch 160, and returns to the reservoir 135. The fluid is prevented from going to the fluid motor by reason of the position of spools 157 and 158. Now, when the three-armed lever 113 moves the valve rod 134 to the right, as seen in Fig. 6, upon the tripping of the machine, the spool 156 is moved far enough to the right to cover the opening of branch 160 into the chamber 155 and thus prevents the fluid driven through intake port 149 from returning to the reservoir. By the same movement of rod 134 to the right, spools 157 and 158 move to the right, unblocking, respectively, pipes 161 and 162. The spool 157 being intermediate of the openings of pipes 161 and 162 into chamber 155, the driven fluid received through port 149 will pass out through pipe 161 which branches into pipes 163 and 164. The fluid motor 165 is of the rotary vane turbine type, having four vanes in axially slotted grooves of the rotor, the vanes being forced outwardly, by springs, against the cylindrical walls of the motor chamber 166. The pump-driven fluid enters the two pipes 163 and 164 and leaves through pipes 167 and 168, which join into pipe 162, and passes through the valve to pipe 159 leading to the reservoir 135. The drive shaft 169 of the fluid motor has secured to the outer end thereof the drive plate 34. It will be seen, therefore, that when the three-armed lever 113, which is part of the release mechanism, is in normal position, the fluid drive, even though energized by the electric motor, is ineffective to drive the fluid motor and, when the three-armed lever 113 is in tripped position, the valve is so positioned that the fluid motor is operated when the fluid drive is energized, driving the main operating mechanism unless otherwise restrained.

Release of machine by digit keys and control keys

Figure 11:
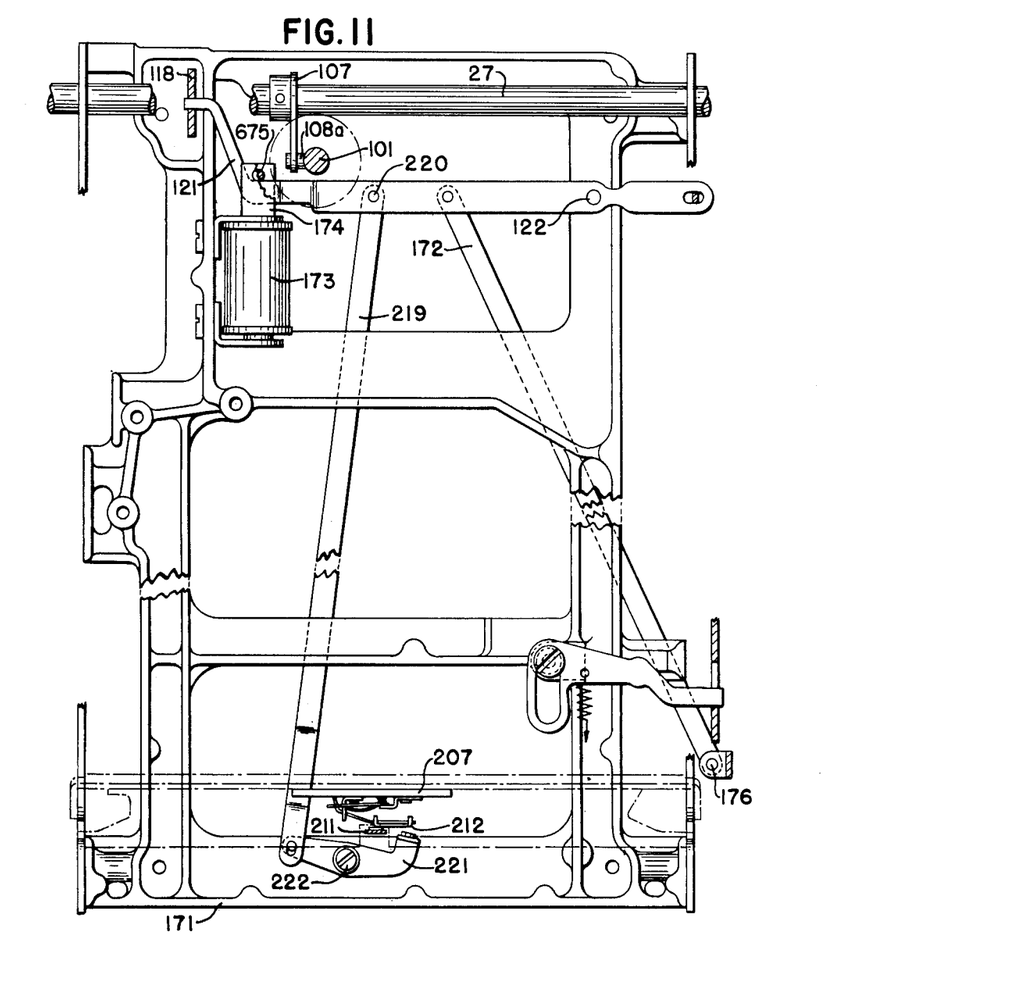
Fig. 11 is a plan view of the mechanism for tripping the latch of the machine tripping means, including the solenoid, the coupling from the control keys to the latch tripping means, and the means by which the actuation of the solenoid opens the solenoid switch.

The machine release latch 118 is tripped, as has been said, by trip lever 121 (Figs. 14 and 11). Fig. 11 is a top plan view of the base 171 of the machine, showing the trip lever 121 pivoted to the base at 122 so that it may be rocked counterclockwise by the trip link 172, when it is pulled forwardly under the control of the control keys, or as rocked by the solenoid 173 when the solenoid is energized, pulling on armature 174. Armature 174 has a forked end which embraces the trip lever 121 and is secured thereto by pin 675.

The forward end of trip lever 172 is pivoted at 176 to a bent-over ear of the lower extending arm of a multiple-armed lever 177 (Fig. 3) pivoted at 178 to the right side frame 179 of the machine. The lever 177, as seen in Fig. 3, is held in the position shown in said figure by a spring 180, from which position it may be rocked clockwise to pull the link 172 forwardly to release the machine for operation.

Pivoted to the multiple-armed lever 177 at 181 is a bell crank lever 182, having an upwardly extending arm 183 with a bent-over ear held in contact with the upper extending arm 184 of lever 177 by a spring 185. This mechanism is shown apart from the rest of the mechanism of Fig. 3 in Fig. 13. Referring to Fig. 13, the rearwardly extending arm of lever 182 is bifurcated so that it has an upper fork 186 and a lower fork 187. Also pivoted on pivot 181 is a rearwardly extending lever 188, having a stud 189 which bears on the upper edge of the rearwardly extending arm of the lever 182. There is another stud 190 on the extreme rear end of the lever 188 against which a shoulder 191 of a lower extending arm of add motor bar 24 rests. When the motor bar 24 is depressed the lever 188 rocks clockwise around the pivot 181 carrying lever 182 with it, and through spring connection 185 with lever 177, rocks that lever against the resistance of spring 180 to release the machine for a cycle of operation. When the total key 21 is depressed, a shoulder 192 on a lower extending arm of the total key presses against a stud 193 on a slide 194, which is slidably mounted by a pin and slot connection to the right side frame of the machine, and which is normally held in an upward position by a spring 195. Pivotally mounted on the right side frame plate of the machine is a bell crank lever 197, the upwardly extending arm of which makes contact with stud 198 on slide 194 so that when slide 194 is moved downwardly, through depression of the total key 21, the bell crank lever 197 is rocked clockwise. At the elbow of the bell crank lever 197 there is a stud 199 which engages a shouldered slot 200 in the upper end of a link 201, connected at its lower and forward end by a pivot 202 to a lever 203, pivoted at 204 to the right frame of the machine. Lever 203 has a stud 205 which rests against the upper edge of the lower fork of lever 182. Upon depression of the total key, the link 201 will be forced downwardly and forwardly, the lever 203 being rocked counterclockwise around stud 204, causing stud 205 to rock lever 182 clockwise around pivot 181, which, through the aforesaid spring connection 185 with lever 177, rocks the lever 177 in machine release direction, initiating a machine operation.

It has been shown how the machine can be released by the add control bar and the total control key. The subtract key and the non-add key also are enabled to rock lever 177, through various mechanisms disclosed fully in the United States patent application, Serial No. 237,758, beforementioned, and will not be decribed herein as unessential to an understanding of the invention.

Figure 9:
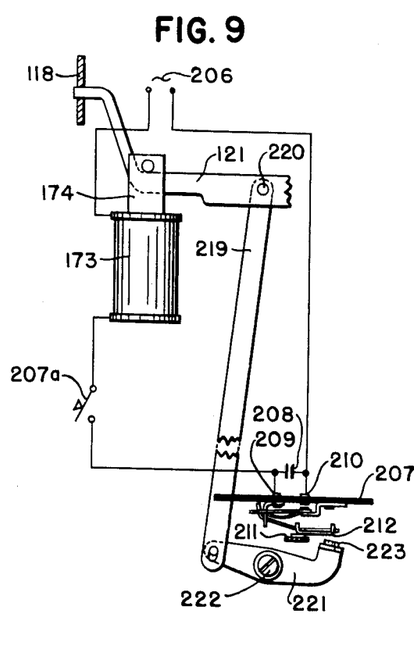
Fig. 9 is a partially diagrammatic showing of the solenoid switch, the solenoid, and the latch tripping means actuated by the solenoid, together with the energizing circuit for the solenoid.

Referring to Fig. 9, the solenoid 173 is energizable by a circuit connecting it with the source of potential 206 through a main switch 207a, which is closed at the commencement of a series of operations in which it is desired to initiate machine operations by means of the digit keys, and through a normally open digit-key-operated switch 207, which is shunted by a condenser 208.

Figures 7, 8:
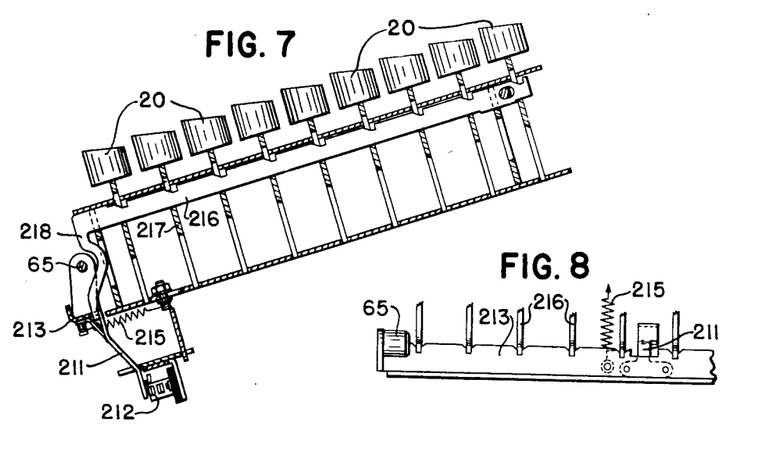
Fig. 7 is a section through a portion of the keyboard showing the means by which the operation of a digit key closes the solenoid energizing switch.
Fig. 8 is a plan view of the solenoid switch operating member as it relates to the key-operated slide plates which actuate it.

The switch 207 of the toggle type, having terminals 209 and 210, is shown in Fig. 9 in the open condition, with the machine at rest. It is normally held open by the pressure of depending arm 211 (see also Fig. 7) on switch arm 212, the switch being biased so that when pressure is removed from arm 212 the switch 207 will close. Arm 211 is secured to a bail 213, running the width of the keyboard and pivoted as at 65 to the rod supported in the side plates of the key bank unit which also supports the key release bail 63. A spring 215 normally swings the bail counterclockwise around its pivots, as shown in Fig. 7, so arm 211 will hold switch 207 open. Each denominational key bank is provided with a beveled notch slide 216 (see also Fig. 10) each of which extends through slots 217 in all of the keys of the row with which it is associated. As a key is depressed to the latching point, the top of its slot 217 engages the beveled surface of the associated notch, there being a notch for each key, and further pressure on the key will move the slide forwardly. Each slide has a downwardly projecting finger 218, resting against the bail 213 (see also Fig. 8), and to so press the key past the latching point, additional pressure must be used in addition to that which is required to depress the key against its return spring 58 (Fig. 2), as the slide must move against resistance of spring 215, as the bail moves clockwise, as seen in Fig. 7. This second stage of digit key operation removes the pressure on switch arm 212, allowing the switch 207 to close, thus initiating a machine operation.

Referring to Fig. 9, as the left end of trip lever 121 moves forwardly, it also moves forwardly link 219 pivoted at 220 to said trip lever 121. The link 219 is coupled by a pin and slot connection to one end of a lever 221 pivoted at 222 to the machine base (see also Fig. 11) so that as the machine is tripped the other end 223 of lever 221 engages arm 212, pushing it inwardly and opening the switch, thus allowing the latch 118 to resume effective latching position, so the machine will stop at the end of a cycle. As the key or keys are released by the operator releasing pressure thereon, arm 211, through the action of spring 215, again engages arm 212 of the switch, pushing it inwardly and opening the switch. By the time arm 211 has become effective to open the switch, the machine release means is moving toward home position and will relatch, thus restoring the trip lever 121, link 219 and lever 221 to the position shown in Figs. 9 and 11. If a digit key is held in full depressed position the arm 211 will not become effective and, as the release means is moved by its spring 114 toward normal position and lever 221 moves to ineffective position, the switch 207 will again close, moving the latch to released position and recycling the machine. The timing of the mechanism is such that the latch is removed for the second cycle before the machine has really come to a halt.

Referring to Fig. 6, it will be understood that as soon as drive plate 34 comes to a stop at the end of a machine operation, by reason of the hitting of stud 132 on the three-armed lever 113, the fluid motor will also be stopped, being mechanically coupled to the drive plate 34, and the energy of the moving fluid, driven by the still-running electric motor, will be dissipated through the relief valve 151, which returns the moving fluid to the reservoir. There has been provided in the reservoir an air vent 224 to allow for differences in internal air pressure in the reservoir.

In the operation of this machine when set for digit-key cycle initiation, all that it is necessary for the operator to do is to set up all but the last digit of the amount to be entered on the keyboard, against the ordinary resilience of the return springs of the keys, and thereafter, when the last digit key in that operation is depressed, to give it an extra movement against the added resistance of spring 215. The novel mechansim will initiate a cycle of operation, after which the machine comes to rest with the motor running continuously for several minutes, as adjusted by the set screw 106 (Fig. 12). If no other entry is made, the dashpot comes to home position, opening the switch 93 of the auxiliary motor circuit, causing the motor to stop. If repeated entries are made, the keys are set up and operated as before described, the extra movement of the key last depressed releasing the machine, which will move the dashpot to the fully moved position, commencing its period of return to home position all over again.

While the form of mechanism herein shown and described is admirably adapted to fulfill the objects primarily stated, it is to be understood that it is not intended to confine the invention to the one form or embodiment herein disclosed, for it is susceptible of embodiment in various other forms.

What is claimed is:

1. In a calculating machine, the combination of a cyclically operable main drive means; a fluid motor for driving the main drive means and coupled thereto; a fluid drive system including a circulatory system having a by-pass branch and a fluid motor branch, a valve having a home position directing the fluid moving in the system so that it moves only through the by-pass branch, said valve in a moved position directing the fluid moving in the system so that it moves only through the fluid motor branch, and a fluid pump, operation of which drives the fluid through the system; an electric motor coupled to the fluid pump for driving it; a circuit for supplying electric energy to the electric motor, said circuit including two branches, each having a switch normally held open, the closing of either switch or the closing of both switches supplying electric energy to the electric motor to drive it, and consequently to drive the fluid pump; a machine trip means having a normal position in which it mechanically blocks the main drive means, and having a moved position in which it holds a first one of said switches closed and is in unblocking position with respect to the main drive means; a latch for holding the trip means in normal position; a means tending to move the trip means from normal position; a solenoid coupled to the latch so that when the solenoid is energized, the latch is rendered ineffective, allowing the trip means to move, de-energization of the solenoid allowing the latch to resume its effective position to latch the trip means upon its being returned to home position; a retarding device having a home position in which it holds the second of the two switches open against a tendency to close, and a moved position in which the second switch is permitted to close; means tending to move the retarding device to home position if moved therefrom; means retarding the homing movement of the retarding device so that the homing movement takes a longer time than a plurality of machine cycles; and retarder moving means on the main drive means that moves the retarding device to its moved position during a machine cycle, said retarder moving means being ineffective when the main drive means is in home position.

2. In a calculating machine, the combination of a cyclically operable main drive means; a fluid motor for driving the main drive means and coupled thereto; a fluid drive system including a circulatory system having a by-pass branch and a fluid motor branch, a valve having a home position directing the fluid moving in the system so that it moves only through the by-pass branch, and said valve in a moved position directing the fluid moving in the system so that it moves only through the fluid motor branch, and a fluid pump, operation of which pump drives the fluid through the system; an electric motor coupled to the fluid pump for driving it; a circuit for supplying electric energy to the electric motor, said circuit including two branches, each having a switch, a first one of the switches tending to stay open and the second tending to stay closed, the closing of either switch or both supplying electric energy to the electric motor to drive it, and consequently drive the fluid pump; a machine trip means having a normal position, in which it has no effect on the first one of said switches and mechanically blocks the main drive means, and having a moved position in which it closes the said first switch and in which moved position the blocking action is rendered inoperative; a latch for holding the trip means in normal position; a means tending to move the trip means from normal position; a solenoid coupled to the latch so when the solenoid is energized the latch is rendered ineffective, allowing the trip means to move, de-energization of the solenoid allowing the latch to resume its effective position to latch the trip means upon its being returned to home position; a retarting device having a home position in which it holds the second switch open, and a moved position in which the second switch is permitted to close; means tending to move the retarding device to home position if it is moved therefrom; means retarding the homing movement so that the homing movement takes a longer time than a plurality of machine cycles; retarder moving means on the main drive means that moves the retarding device to its moved position during a machine cycle, said retarder moving means being ineffective when the main drive means is in home position; a circuit for supplying electric energy to the solenoid, said circuit including a normally open switch which when closed completes the circuit; a plurality of keys operable from a normal position to an operated condition, the operation of any key closing the switch in the solenoid circuit.

3. In a calculating machine having an electric motor; a main drive means cyclically operable; a movable machine release member which in home position blocks the main drive means and in moved position releases the main drive means, the combination of an electric circuit for energizing the electric motor, said circuit having a first switch normally opened but resiliently closable, and a second switch normally open, but tending to close, the closing of either switch or both switches completing the circuit to the electric motor; means on the release member for closing the first switch when the release member is in moved position; a timer having a normal position in which it holds the second switch open, and which when moved from normal position allows the second switch to close, said timer, when moved, gradually returning to normal position; means operable during a cycle of the main drive means to move the timer from home position, but not preventing its return to home position after the end of a cycle of operation of the main drive means; a fluid motor coupled to the main drive means; a fluid drive means including a fluid pump coupled to the electric motor, a reservoir of fluid, a branched conduit system and valve, which valve may be positioned to route fluid to the fluid motor or to the reservoir; means coupling the release means and the valve so that when the release means is in home position fluid is routed to the reservoir and when the release means is in moved position the fluid is routed to the fluid motor.

4. The machine of claim 3 in which there is provided means which constantly tends to move the release member to a moved position; a latch engaging the release member in home position, to hold it there until the latch is disabled; means on the main drive means moving the release means to home position at the end of a machine cycle; a solenoid coupled to the latch so that when the solenoid is energized the latch is disabled and so that when the solenoid is de-energized the latch is in effective condition.

5. The device of claim 4 in which the blocking means provided on the release member is a lever which in home position is in the path of a stud on the main drive means.

6. The device of claim 5 in which a solenoid energizing circuit is provided with a switch that when closed completes the circuit to the solenoid, thus causing the release of the machine, said switch being resiliently biased to open; in which there are a plurality of digit keys, each operable from home position and each of which when fully operated closes the solenoid circuit switch, said keys, when all are in home position, permitting the solenoid circuit switch to open.

7. The device of claim 6 in which the keys are resiliently urged to home position, in which each key has two degrees of movement, the first degree of movement being to a latching position, and the second degree of movement being full operation, to close the solenoid circuit switch; in which latching means is provided to hold each operated key from returning toward home past latching position when the key operating force is removed; and in which a key release means is provided, said release means being actuated near the end of a cycle of the main drive means, by the main drive means, to release operated keys.

8. In a calculating machine having a totalizer; differentially settable means for entering data into and taking data from the totalizer; denominational orders of digit keys for controlling the differentially settable means; the combination therewith of a cyclically operable main operating means including a fluid motor, said main operating means having a home position; cycle control means including a trip member and a latch normally latching the trip member in untripped position against means tending to move it to released position, said trip member when in home position blocking the main operating means from moving past home position; an electric motor; a circuit for supplying electric energy to the motor, said circuit including a main switch, said main switch being normally open but controlled by the trip member so as to close it when the trip member is in moved position; an auxiliary circuit for supplying electric energy to the electric motor, said auxiliary circuit including a switch in series therewith, said switch normally tending to close; a timing mechanism resiliently movable from a home position where it holds the switch in the auxiliary circuit open, to a moved position region where said switch in the auxiliary circuit is closed, said timing mechanism being adjusted to take more time to return to home position than is consumed in a plurality of cycles of the main operating means; means on the main operating means that moves the timing mechanism to completely moved position at each cycle of the main operating means; a fluid drive for the motor, including a pump operated by the electric motor, a conduit system, and a movable valve for routing the driven fluid through the conduit system to the fluid motor or through a by-pass; means coupling the trip means to the valve so that when the trip member is in untripped position the valve is adjusted to route the fluid through the by-pass and when the trip member is in moved position the valve is adjusted to route the fluid through the pump; and means to temporarily disable the latch to commence a cycle of operation of the main operating means.

9. The machine of claim 8 in which the latch disabling means is a solenoid which when energized disables the latch.

10. The machine of claim 9 in which the solenoid is energizable by an electric circuit having in series therewith a normally open switch, the closing of which completes the circuit.

11. The machine of claim 10 in which there is provided coupling means between all the digit keys and the solenoid switch so that when a digit key is fully operated the switch is closed.

12. The machine of claim 11 in which the digit keys each have resilient means normally holding them in normal position, from which normal position they may be moved by an operator to a latching position in which they control the differentially settable means and from which they may be moved further to a fully operated position in which, in addition to controlling the differentially settable means, they close the solenoid switch; in which there is provided key-latching means to prevent return of a key to normal position after it has been operated as far as latching position; and in which there is provided key-releasing means that disables the key latching means near the end of a machine cycle.

13. In a calculating machine having a totalizer; a cyclically operable main operating means; a plurality of digit keys resiliently operable from a normal position to a depressed position in which they control entry of data into the totalizer; key latching means which latch depressed keys; key release means operable at the close of a machine cycle to release latched keys to allow operated keys to return to normal position; an electric motor coupled to an energizing circuit having a normally open switch in series therewith; and starting means, held in normal position by a latch, but which tends to move from latched position and close the switch when the latch is released, said latch tending to relatch the starting means if moved back to normal position after having moved therefrom resulting in the opening of the switch, the combination of an auxiliary circuit for energizing the electric motor, said circuit having a switch which, unless prevented, closes and causes operation of the motor; a retarder having a normal position and a moved position from which it tends slowly to move back to normal position, said retarder being adjustable so that movement from moved position to normal position takes time sufficient for more than one machine operation, said retarder in normal position holding the switch of the auxiliary circuit open, the movement of the retarder away from normal position permitting the auxiliary switch to close; means on the main operating means which moves the retarder from a normal position or partially returned position to fully moved position during a machine operation; a fluid-driven motor for driving the main operating means; a fluid drive coupled to the electric motor and energized thereby; a valve movable from a normal position to a moved position, the valve in normal position diverting the fluid drive from the fluid motor and in moved position directing the fluid drive to the fluid motor; means coupling the valve and the starting means so that when the starting means is in normal position the valve is in normal position, and when the starting means is in moved position the valve is in moved position; and means intermediate the digit keys and the starting latch and operated by full operation of a digit key which releases the latch and initiates a machine operation in which the electric motor keeps running after a cycle of machine operation.

14. The device of claim 13 in which the digit keys each have a step of movement beyond the latching position to a fully operated position; in which there is provided a solenoid coupled to the starting means latch and connected in an energizing circuit having a normally open switch, the energization of the solenoid tripping the latch to start a cycle of machine operation; and means intermediate the keys and the solenoid switch, and moved whenever a digit key is moved to fully operated position, to close the solenoid switch.

15. In a calculating machine, the combination of a totalizer; totalizer control means including one or more denominational rows of digit keys; a cyclically-operable main operating means, including a fluid-driven motor for actuating said operating means; an electric motor including a normally open circuit that may be closed to connect the motor to a source of electric energy; a fluid drive actuated by the electric motor when running; machine-starting means actuated by depression of a selected digit key, said starting means including a solenoid; a circuit for energizing the solenoid, said circuit including a normally open switch which is closed by operation of the selected key to energize the solenoid, a normally open switch in the motor circuit which is closed by the solenoid when energized, and a valve which normally diverts the fluid drive from the fluid motor, said valve being moved by the solenoid when energized to direct the fluid drive to the fluid motor, said starting means being returned to normal by the main operating means at the end of a cycle of machine operation; and an auxiliary electric motor circuit and timer, the timer being moved from normal position by operation of the main operating means and returning to normal position only after the conclusion of a period of time required for a plurality of machine cycles, said timer holding the auxiliary circuit open when in normal position and allowing the auxiliary circuit to close when in moved position, said auxiliary circuit when closed energizing the electric motor.

References Cited in the file of this patent

UNITED STATES PATENTS

| | | |
|---|---|---|
| 905,146 | Carroll | Dec. 1, 1908 |
| 910,690 | Kettering | Jan. 26, 1909 |
| 953,276 | Main | Mar. 29, 1910 |
| 974,480 | Foster | Nov. 1, 1910 |
| 1,270,868 | Raber | July 2, 1918 |
| 1,507,922 | Liedl | Sept. 9, 1924 |
| 2,318,241 | Mathi | May 4, 1943 |
| 2,552,789 | Hopkins | May 15, 1951 |
| 2,573,022 | Homan | Oct. 30, 1951 |